(12) United States Patent
Cui et al.

(10) Patent No.: US 10,753,211 B2
(45) Date of Patent: Aug. 25, 2020

(54) HETEROGENEOUS COMPOSITION, ARTICLE COMPRISING HETEROGENEOUS COMPOSITION, AND METHOD FOR FORMING ARTICLE

(71) Applicant: GENERAL ELECTRIC COMPANY, Schenectady, NY (US)

(72) Inventors: Yan Cui, Greer, SC (US); Brian Tollison, Honea Path, SC (US); Srikanth Kottilingam, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 579 days.

(21) Appl. No.: 15/375,378

(22) Filed: Dec. 12, 2016

(65) Prior Publication Data

US 2018/0230824 A1 Aug. 16, 2018

(51) Int. Cl.
 *F01D 5/28* (2006.01)
 *C22C 47/08* (2006.01)
 (Continued)

(52) U.S. Cl.
 CPC .............. *F01D 5/282* (2013.01); *B22F 5/009* (2013.01); *B22F 5/04* (2013.01); *B22F 7/062* (2013.01);
 (Continued)

(58) Field of Classification Search
 CPC ................ B23K 35/327; B23K 26/342; B23K 2101/001; B23K 2103/26; B23K 2103/52;
 (Continued)

(56) References Cited

U.S. PATENT DOCUMENTS 4,735,656 A 4/1988 Schaefer et al.
5,264,011 A 11/1993 Brown et al.
(Continued)

FOREIGN PATENT DOCUMENTS

| GB | 2 429 019 A | 2/2007 |
|---|---|---|
| WO | 2014/074947 A2 | 5/2014 |
| WO | 2016/075423 A1 | 5/2016 |

OTHER PUBLICATIONS

Material Product Data Sheet Amdry 400 Braze Filler Metal, 3 pages, no date, downloaded on Sep. 29, 2019. (Year: 2019).*
(Continued)

*Primary Examiner* — Michael E. La Villa
(74) *Attorney, Agent, or Firm* — McNees Wallace & Nurick LLC

(57) ABSTRACT

A heterogeneous composition is disclosed, including an alloy mixture and a ceramic additive. The alloy mixture includes a first alloy having a first melting point of at least a first threshold temperature, and a second alloy having a second melting point of less than a second threshold temperature. The second threshold temperature is lower than the first threshold temperature. The first alloy, the second alloy, and the ceramic additive are intermixed with one another as distinct phases. An article is disclosed including a first portion including a material composition, and a second portion including the heterogeneous composition. A method for forming the article is disclosing, including applying the second portion to the first portion.

20 Claims, 2 Drawing Sheets

(51) Int. Cl.
| | |
|---|---|
| C22C 47/14 | (2006.01) |
| C22C 49/08 | (2006.01) |
| C22C 49/10 | (2006.01) |
| C22C 1/10 | (2006.01) |
| B22F 7/06 | (2006.01) |
| B23K 35/32 | (2006.01) |
| B23K 15/00 | (2006.01) |
| B23K 26/342 | (2014.01) |
| B22F 5/00 | (2006.01) |
| F01D 5/22 | (2006.01) |
| F01D 5/20 | (2006.01) |
| C22C 1/05 | (2006.01) |
| B22F 5/04 | (2006.01) |
| C22C 19/05 | (2006.01) |
| C22C 47/00 | (2006.01) |
| C22C 19/00 | (2006.01) |
| C22C 49/12 | (2006.01) |
| C22C 49/14 | (2006.01) |
| C22C 49/00 | (2006.01) |
| C22C 1/02 | (2006.01) |
| C22C 47/18 | (2006.01) |
| C22C 49/11 | (2006.01) |
| C22C 47/16 | (2006.01) |
| C22C 49/02 | (2006.01) |
| B32B 15/04 | (2006.01) |
| B32B 15/01 | (2006.01) |
| B22F 3/15 | (2006.01) |
| B22F 3/10 | (2006.01) |
| B23K 103/18 | (2006.01) |
| B23K 103/00 | (2006.01) |
| B23K 101/00 | (2006.01) |
| B22F 3/105 | (2006.01) |
| B33Y 10/00 | (2015.01) |
| C22C 14/00 | (2006.01) |
| C22C 19/03 | (2006.01) |
| C22C 19/07 | (2006.01) |
| C22C 38/00 | (2006.01) |

(52) U.S. Cl.
CPC ...... *B23K 15/0086* (2013.01); *B23K 15/0093* (2013.01); *B23K 26/342* (2015.10); *B23K 35/327* (2013.01); *B32B 15/01* (2013.01); *B32B 15/013* (2013.01); *B32B 15/015* (2013.01); *B32B 15/04* (2013.01); *B32B 15/043* (2013.01); *C22C 1/02* (2013.01); *C22C 1/023* (2013.01); *C22C 1/05* (2013.01); *C22C 1/10* (2013.01); *C22C 1/1084* (2013.01); *C22C 19/00* (2013.01); *C22C 19/05* (2013.01); *C22C 19/051* (2013.01); *C22C 19/053* (2013.01); *C22C 19/055* (2013.01); *C22C 19/056* (2013.01); *C22C 47/00* (2013.01); *C22C 47/14* (2013.01); *C22C 47/16* (2013.01); *C22C 47/18* (2013.01); *C22C 49/00* (2013.01); *C22C 49/02* (2013.01); *C22C 49/11* (2013.01); *C22C 49/12* (2013.01); *C22C 49/14* (2013.01); *F01D 5/20* (2013.01); *F01D 5/225* (2013.01); *F01D 5/28* (2013.01); *F01D 5/284* (2013.01); *F01D 5/286* (2013.01); *F01D 5/288* (2013.01); *B22F 3/10* (2013.01); *B22F 3/1055* (2013.01); *B22F 3/15* (2013.01); *B23K 2101/001* (2018.08); *B23K 2103/18* (2018.08); *B23K 2103/26* (2018.08); *B23K 2103/52* (2018.08); *B33Y 10/00* (2014.12); *C22C 14/00* (2013.01); *C22C 19/03* (2013.01); *C22C 19/07* (2013.01); *C22C 38/00* (2013.01); *C22C 47/08* (2013.01); *C22C 49/08* (2013.01); *C22C 49/10* (2013.01); *F05D 2230/42* (2013.01); *F05D 2300/2112* (2013.01); *F05D 2300/2261* (2013.01); *F05D 2300/2262* (2013.01); *F05D 2300/2263* (2013.01); *F05D 2300/2284* (2013.01); *F05D 2300/6031* (2013.01); *F05D 2300/6032* (2013.01); *Y10T 428/12806* (2015.01); *Y10T 428/12854* (2015.01); *Y10T 428/12931* (2015.01); *Y10T 428/12937* (2015.01); *Y10T 428/12944* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01)

(58) Field of Classification Search
CPC ............ B23K 2103/18; B23K 15/0086; B23K 15/0093; F01D 5/282; F01D 5/20; F01D 5/225; F01D 5/28; F01D 5/288; F01D 5/284; F05D 2230/42; F05D 2300/2261; F05D 2300/2263; F05D 2300/6031; F05D 2300/2112; F05D 2300/6032; F05D 2300/2262; F05D 2300/2284; B22F 3/10; B22F 3/15; B22F 5/009; B22F 7/062; B22F 5/04; B22F 3/1055; C22C 1/05; C22C 1/10; C22C 1/1084; C22C 1/02; C22C 1/023; C22C 47/14; C22C 47/08; C22C 47/00; C22C 47/16; C22C 47/18; C22C 49/10; C22C 49/08; C22C 49/00; C22C 49/02; C22C 49/11; C22C 49/12; C22C 49/14; C22C 38/00; C22C 19/07; C22C 19/03; C22C 19/00; C22C 19/05; C22C 19/055; C22C 19/056; C22C 19/051; C22C 19/053; C22C 14/00; Y10T 428/12931; Y10T 428/12937; Y10T 428/12944; Y10T 428/12951; Y10T 428/12965; Y10T 428/12958; Y10T 428/12972; Y10T 428/12979; Y10T 428/12806; Y10T 428/12854; B32B 15/01; B32B 15/013; B32B 15/015; B32B 15/04; B32B 15/043; B33Y 10/00
See application file for complete search history.

(56) References Cited

U.S. PATENT DOCUMENTS

| | | |
|---|---|---|
| 2001/0050031 A1 | 12/2001 | Bredt et al. |
| 2005/0197431 A1 | 9/2005 | Bredt et al. |
| 2007/0241482 A1 | 10/2007 | Giller et al. |

OTHER PUBLICATIONS

Extended European Search Report and Opinion issued in connection with corresponding EP Application No. 17204981.9 dated May 9, 2018.

* cited by examiner

HETEROGENEOUS COMPOSITION, ARTICLE COMPRISING HETEROGENEOUS COMPOSITION, AND METHOD FOR FORMING ARTICLE

FIELD OF THE INVENTION

The present invention is directed to heterogeneous compositions, articles comprising the heterogeneous compositions, and methods for forming the articles. More particularly, the present invention is directed to heterogeneous compositions, articles comprising the heterogeneous compositions, and methods for forming the articles wherein the heterogeneous compositions include two alloys with different melting points and ceramic additives intermixed as distinct phases.

BACKGROUND OF THE INVENTION

Hard-to-weld (HTW) alloys, such as nickel-based superalloys and certain aluminum-titanium alloys, due to their gamma prime and various geometric constraints, are susceptible to gamma prime strain aging, liquation and hot cracking. These materials are also difficult to join when the gamma prime phase is present in volume fractions greater than about 30%, which may occur when aluminum or titanium content exceeds about 3%. As used herein, an "HTW alloy" is an alloy which exhibits liquation, hot and strain-age cracking, and which is therefore impractical to weld.

These HTW alloys may be incorporated into components of gas turbine engines such as airfoils, blades (buckets), nozzles (vanes), shrouds, combustors, rotating turbine components, wheels, seals, 3d-manufactured components with HTW alloys and other hot gas path components. Incorporation of these HTW alloys may be desirable due to often superior operational properties, particularly for certain components subjected to the most extreme conditions and stresses.

Manufacturing processes and treatments of components incorporating HTW alloys, such as affixing a squealer tip to a pre-existing bucket (blade), is difficult to achieve using standard techniques, as these techniques may damage the HTW alloys or introduce materials which would be weakened or cracked by the elevated temperatures to which the components are subjected to. By way of example, typical brazing techniques are unsuitable because typical braze materials or elements are incorporated into the component which may not meet operational requirements.

BRIEF DESCRIPTION OF THE INVENTION

In an exemplary embodiment, a heterogeneous composition includes an alloy mixture and a ceramic additive. The alloy mixture includes a first alloy having a first melting point of at least a first threshold temperature, and a second alloy having a second melting point of less than a second threshold temperature. The second threshold temperature is lower than the first threshold temperature. The first alloy, the second alloy, and the ceramic additive are intermixed with one another as distinct phases.

In another exemplary embodiment, an article includes a first portion and a second portion. The first portion includes a material composition, and the second portion includes a heterogeneous composition. The heterogeneous composition includes an alloy mixture and a ceramic additive. The alloy mixture includes a first alloy having a first melting point of at least a first threshold temperature, and a second alloy having a second melting point of less than a second threshold temperature. The second threshold temperature is lower than the first threshold temperature. The first alloy, the second alloy, and the ceramic additive are intermixed with one another as distinct phases.

In another exemplary embodiment, a method for forming an article includes applying a second portion to a first portion to form the article. The first portion includes a material composition, and the second portion includes a heterogeneous composition. The heterogeneous composition includes an alloy mixture and a ceramic additive. The alloy mixture includes a first alloy having a first melting point of at least a first threshold temperature, and a second alloy having a second melting point of less than a second threshold temperature. The second threshold temperature is lower than the first threshold temperature. The first alloy, the second alloy, and the ceramic additive are intermixed with one another as distinct phases.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary heterogeneous compositions, articles comprising the heterogeneous compositions, and methods for forming the articles. Embodiments of the present disclosure, in comparison to articles and methods not utilizing one or more features disclosed herein, decrease costs, increase process control, increase reparability, improve mechanical properties, improve wear resistance, improve creep resistance, improve oxidation resistance, improve elevated temperature performance, increase joining capability, increase joint quality, increase durability, increase strength, increase hardness, decrease fissure formation, or a combination thereof.

Figure 1:
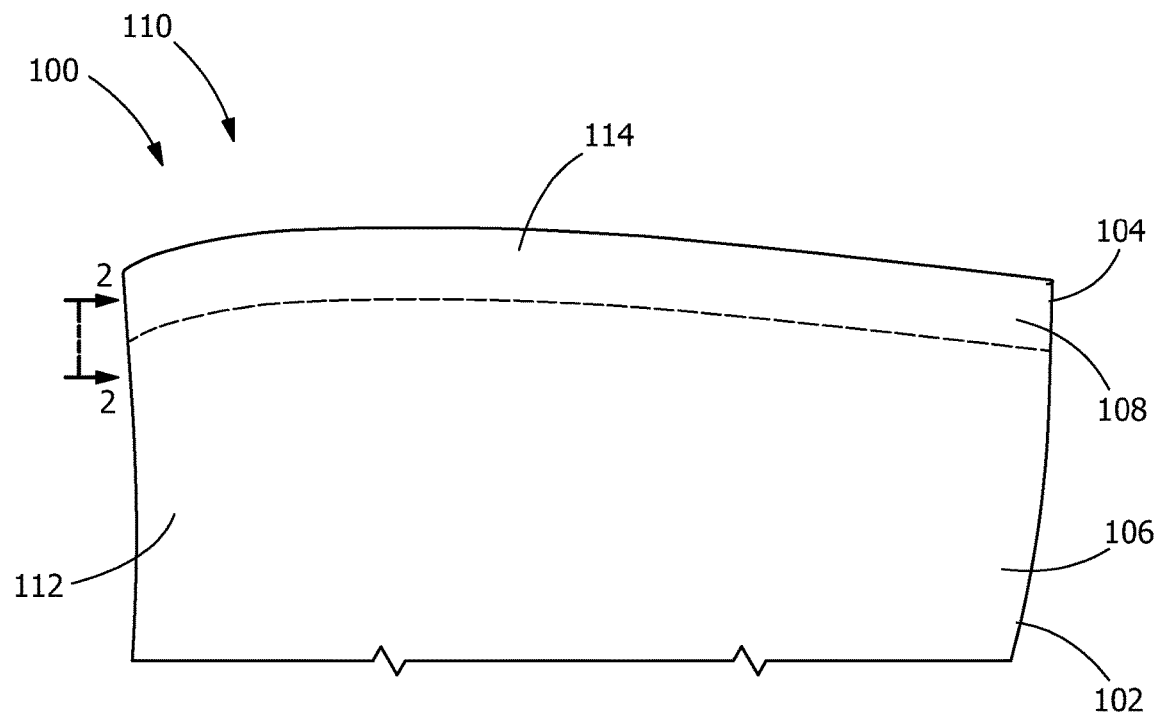
FIG. 1 is a perspective view of an article (turbine bucket (blade)), according to an embodiment of the present disclosure.

Referring to FIG. 1, in one embodiment, an article 100 includes a first portion 102 and a second portion 104. The first portion 102 includes a material composition 106. The second portion 104 includes a heterogeneous composition 108.

Figure 2:
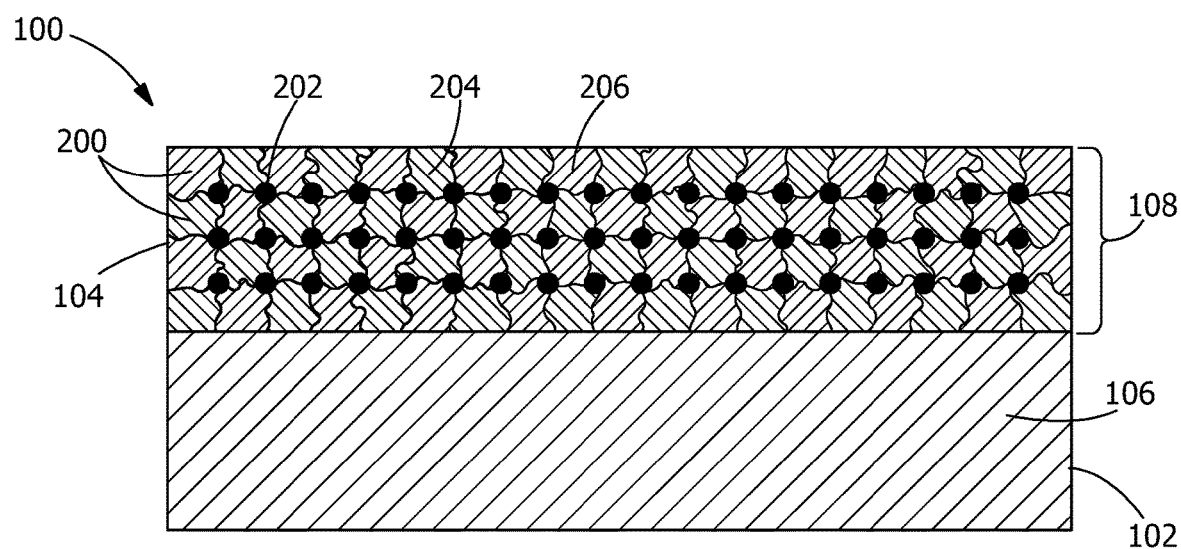
FIG. 2 is a sectional view along lines 2-2 of the article of FIG. 1, according to an embodiment of the present disclosure.

Referring to FIG. 2, in one embodiment, the heterogeneous composition 108 includes an alloy mixture 200 and ceramic additive 202. The alloy mixture 200 includes a first alloy 204 having a first melting point of at least a first threshold temperature, and a second alloy 206 having a second melting point of less than a second threshold temperature. The second threshold temperature is lower than the first threshold temperature. The first alloy 204, the second alloy 206, and the ceramic additive 202 are intermixed with one another as distinct phases.

In one embodiment, the first alloy 204 and the second alloy 206 are uniformly distributed, alternatively essentially uniformly distributed, throughout the alloy mixture 200. As used herein, "essentially uniformly distributed" indicates that there is a less than 10% variance in the distribution. In another embodiment, the first alloy 204 and the second alloy 206 are non-uniformly distributed throughout the alloy mixture 200, non-uniformly indicating a greater than 10% variance in the distribution. In yet another embodiment, the first alloy 204 and the second alloy 206 are bi-modally distributed throughout the alloy mixture 200.

In one embodiment, the ceramic additive 202 is uniformly distributed, alternatively essentially uniformly distributed, throughout the alloy mixture 200 to form the heterogeneous composition 108. In another embodiment, the ceramic additive 202 is non-uniformly distributed throughout the alloy mixture 200 to form the heterogeneous composition 108. In yet another embodiment, the ceramic additive 202 is bi-modally distributed throughout the alloy mixture 200 to form the heterogeneous composition 108. The heterogeneous composition 108 may include an elevated concentration of the ceramic additive in any suitable region of the heterogeneous composition 108, including, but not limited to, an external surface of the heterogeneous composition 108 distal across the heterogeneous composition 108 from the first portion.

The first threshold temperature may be any suitable temperature, including, but not limited to about 2,400° F., alternatively about 2,425° F., alternatively about 2,450° F., alternatively about 2,500° F., alternatively about 2,550° F., alternatively about 2,600° F., alternatively about 2,650° F., alternatively about 2,700° F., alternatively about 2,750° F., alternatively about 2,800° F. The second threshold temperature may be any suitable temperature, including, but not limited to about 2,350° F., alternatively about 2,325° F., alternatively about 2,300° F., alternatively about 2,250° F., alternatively about 2,200° F., alternatively about 2,150° F., alternatively about 2,100° F., alternatively about 2,050° F., alternatively about 2,000° F., alternatively about 1,950° F., alternatively about 1,900° F., alternatively about 1,850° F., alternatively about 1,800° F. In one embodiment, the first threshold temperature and the second threshold temperature do not overlap. In a further embodiment, the first threshold temperature and the second threshold temperature are separated by at least about 5° F., alternatively at least about 10° F., alternatively at least about 15° F., alternatively at least about 20° F., alternatively at least about 25° F., alternatively at least about 30° F., alternatively at least about 40° F., alternatively at least about 50° F., alternatively at least about 75° F., alternatively at least about 100° F.

The alloy mixture 200 may include any suitable amount of the first alloy 204 and the second alloy 206. In one embodiment, the alloy mixture 200 includes, by weight, up to about 95% of the first alloy 204, alternatively up to about 90%, alternatively up to about 85%, alternatively up to about 80%, alternatively up to about 75%, alternatively from about 40% to about 95%, alternatively from about 50% to about 95%, alternatively from about 50% to about 90%, alternatively from about 50% to about 85%, alternatively from about 50% to about 80%, alternatively from about 50% to about 75%. In another embodiment, the alloy mixture 200 includes, by weight, up to about 60% of the second alloy 206, alternatively up to about 55%, alternatively up to about 50%, alternatively up to about 45%, alternatively up to about 40%, alternatively from about 5% to about 50%, alternatively from about 10% to about 50%, alternatively from about 15% to about 50%, alternatively from about 20% to about 50%, alternatively from about 15% to about 45%, alternatively from about 15% to about 40%. In yet another embodiment, the alloy mixture 200 includes a weight ratio of the first alloy 204 to the second alloy 206 of between about 95:5 to about 50:50, alternatively between about 90:10 to about 65:35, alternatively between about 85:15 to about 75:25. In a further embodiment, the alloy mixture 200 consists essentially of the first alloy 204 and the second alloy 206, excluding impurities forming less than about 3% of the alloy mixture 200, alternatively less than about 2% of the alloy mixture 200, alternatively less than about 1% of the alloy mixture 200.

The first alloy 204 may be any suitable material, including, but not limited to, a superalloy, a hard-to-weld (HTW) alloy, a refractory alloy, a nickel-based superalloy, a cobalt-based superalloy, an iron-based superalloy, an iron-based alloy, a steel alloy, a stainless steel alloy, a cobalt-based alloy, a nickel-based alloy, a titanium-based alloy, a titanium aluminide, GTD 111, GTD 444, HAYNES 188, INCONEL 738, MAR-M-247, René108, René142, René195, and RenéN2, or a combination thereof.

The second alloy 206 may be any suitable material, including, but not limited to, a braze alloy, an iron-based alloy, a steel alloy, a stainless steel alloy, a cobalt-based alloy, a nickel-based alloy, a titanium-based alloy, DF-4B, BNi-2, BNi-5 (AMS 4782), BNi-9, or a combination thereof.

As used herein, "DF-4B" refers to an alloy including a composition, by weight, of about 14% chromium, about 10% cobalt, about 3.5% aluminum, about 2.5% tantalum, about 2.75% boron, about 0.05% yttrium, and a balance of nickel.

As used herein, "BNi-2" refers to an alloy including a composition, by weight, of about 3% iron, about 3.1% boron, about 4.5% silicon, about 7% chromium, and a balance of nickel.

As used herein, "BNi-5" and "AMS 4782" refer to an alloy including a composition, by weight, of about 10% silicon, about 19% chromium, and a balance of nickel.

As used herein, "BNi-9" refers to an alloy including a composition, by weight, of about 15% chromium, about 3% boron, and a balance of nickel.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "HAYNES 188" refers to an alloy including a composition, by weight, of about 22% chromium, about 22% nickel, about 0.1% carbon, about 3% iron, about 1.25% manganese, about 0.35% silicon, about 14% tungsten, about 0.03% lanthanum, and a balance of cobalt.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "MAR-M-247" refers to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel.

As used herein, "René108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René142" refers to an alloy including a composition, by weight, of about 6.8% chromium, about 12% cobalt, about 6.1% aluminum, about 4.9% tungsten, about 1.5% molybdenum, about 2.8% rhenium, about 6.4% tantalum, about 1.5% hafnium, and a balance of nickel.

As used herein, "René195" refers to an alloy including a composition, by weight, of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel.

As used herein, "RenéN2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

The ceramic additive 202 may include any suitable material, including, but not limited to, aluminum oxide, silicon carbide, tungsten carbide, titanium nitride, titanium carbonitride, titanium carbide, or a combination thereof. The ceramic additive 202 may include any suitable configuration, including, but not limited to, powder (shown), fiber, nanotube, or a combination thereof.

The heterogeneous composition 108 may include any suitable amount of the alloy mixture 200 and the ceramic additive 202. In one embodiment, the heterogeneous composition 108 includes, by volume, up to about 99% of the alloy mixture 200, alternatively up to about 95%, alternatively up to about 90%, alternatively up to about 85%, alternatively up to about 80%, alternatively up to about 75%, alternatively up to about 70%, alternatively from about 65% to about 99%, alternatively from about 70% to about 99%, alternatively from about 75% to about 99%, alternatively from about 75% to about 95%, alternatively from about 75% to about 90%, alternatively from about 75% to about 85%. In another embodiment, the heterogeneous composition 108 includes, by volume, up to about 60% of the ceramic additive 202, alternatively up to about 50%, alternatively up to about 40%, alternatively up to about 30%, alternatively up to about 25%, alternatively from about 1% to about 50%, alternatively from about 1% to about 40%, alternatively from about 1% to about 30%, alternatively from about 5% to about 25%, alternatively from about 10% to about 25%, alternatively from about 15% to about 25%. In yet another embodiment, the heterogeneous composition 108 includes a volume ratio of the alloy mixture 200 to the ceramic additive 202 of between about 99:1 to about 50:50, alternatively between about 90:5 to about 70:30, alternatively between about 85:15 to about 75:25. In a further embodiment, the heterogeneous composition 108 consists essentially of the alloy mixture 200 and the ceramic additive 202, excluding impurities forming less than about 3% of the heterogeneous composition 108, alternatively less than about 2% of the heterogeneous composition 108, alternatively less than about 1% of the heterogeneous composition 108.

In one embodiment, the heterogeneous composition 108 is a particulate. In another embodiment, the heterogeneous composition 108 is a pre-sintered preform. The pre-sintered preform may be formed from the particulate.

Figure 3:
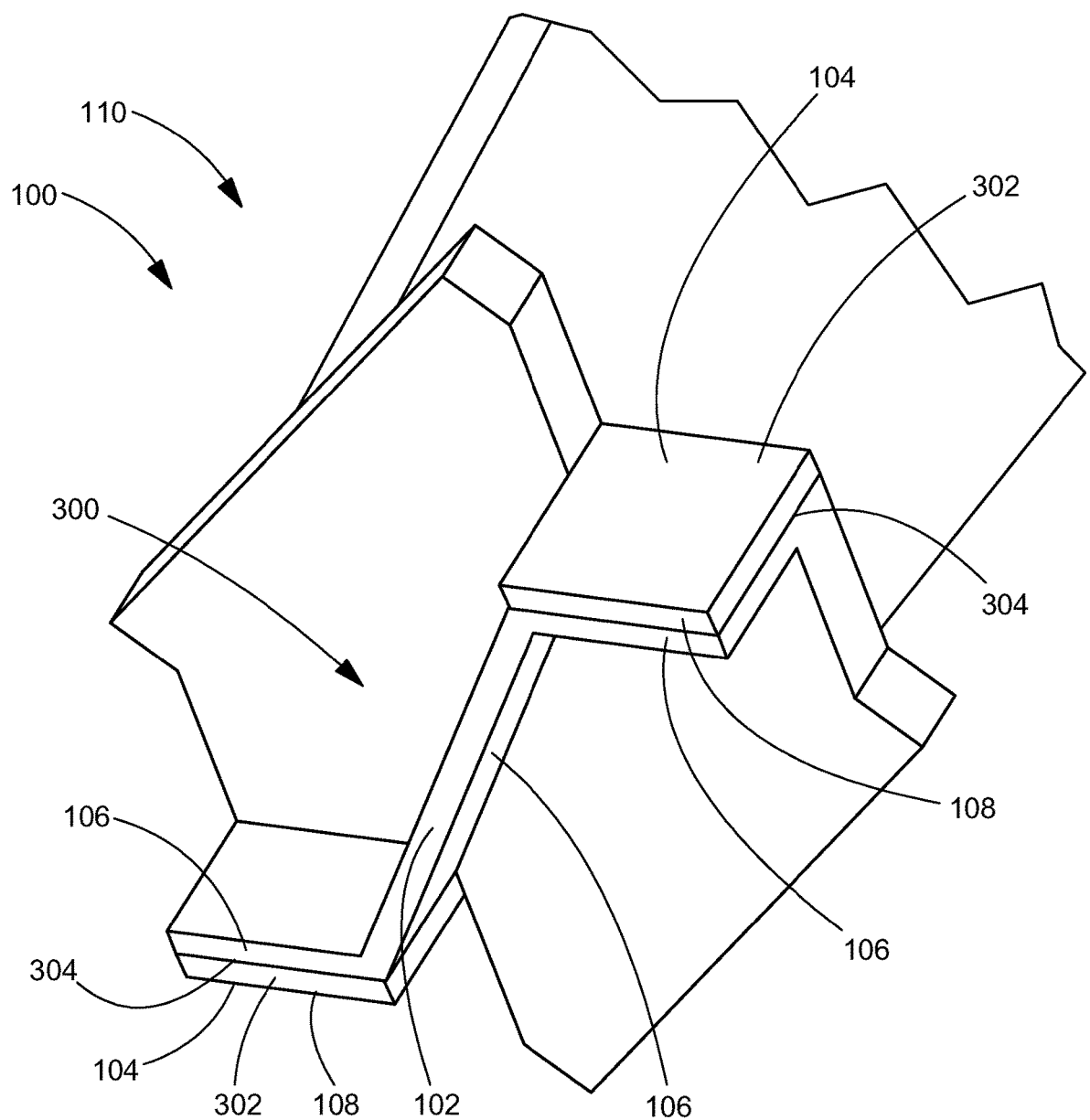
FIG. 3 is a perspective view of an article (shrouded turbine bucket (blade)), according to an embodiment of the present disclosure.

Referring to FIGS. 1 and 3, in one embodiment, the article 100 is a turbine component 110. The article 100 may be any suitable turbine component 110, including, but not limited to, a bucket (blade) (shown as the turbine component 110 in FIG. 1) or a shrouded turbine bucket (blade) (shown as the turbine component in FIG. 3). In one embodiment (shown in FIG. 1), wherein the turbine component 110 is a bucket (blade), the first portion 102 is an airfoil 112 and the second portion 104 is a squealer tip 114. In another embodiment (shown in FIG. 3), wherein the turbine component is a shrouded turbine bucket (blade), the first portion 102 is a shroud portion 300 of the shrouded turbine bucket (blade), and the second portion 104 is a contact pad 302 at the inter-shroud contact surface 304.

At least one of the material composition 106 and the first alloy 204 may include an HTW alloy. In one embodiment, each of the material composition 106 and the first alloy 204 includes an HTW alloy. The HTW alloy of the material composition 106 and the first alloy 204 may be the same HTW alloy or compositionally distinct HTW alloys. In an embodiment wherein each of the material composition 106 and the first alloy 204 includes an HTW alloy, the article 100 formed may include increased wear resistance, increased creep resistance, increased oxidation resistance, or a combination thereof, in the second portion 104 in comparison to a comparable article lacking an HTW alloy in a comparable second portion 104, due to advantageous properties for HTW allows which are otherwise difficult to join to one another.

In one embodiment, a method for forming an article 100 includes applying the second portion 104 to the first portion 102 to form the article 100. Applying the second portion 104 to the first portion 102 may include depositing the heterogeneous composition 108 onto the first portion 102 by an additive manufacturing technique, depositing a pre-sintered preform including the heterogeneous composition 108 onto the first portion 102 and brazing the pre-sintered preform to the first portion 102, or a combination thereof. In one embodiment, the pre-sintered preform is formed by an additive manufacturing technique. The second portion 104 may be applied at near-net shape to the first portion 102 or may be applied in rough form and then adjusted to final shape subsequent to application or joining.

The additive manufacturing technique may be any suitable technique, including, but not limited to, direct metal laser melting, selective laser sintering, direct metal laser sintering, selective laser melting, electron-beam melting, electron beam freeform fabrication, binder jetting, or combinations thereof. In one embodiment, the first portion 102 is pre-heated to a suitable temperature prior to the second portion 104 being applied by the additive manufacturing technique. In another embodiment, the first portion 102 is not pre-heated prior to the second portion 104 being applied by the additive manufacturing technique.

Following applying the second portion 104 to the first portion 102, the article may be subjected to sintering, hot isostatic pressing, or a combination thereof. Sintering may be conducted at any suitable sintering temperature, including, but not limited to, a sintering temperature of from about 1,500° F. to about 2,375° F., alternatively from about 1,600° F. to about 2,350° F., alternatively from about 1,700° F. to about 2,325° F., alternatively from about 1,800° F. to about 2,300° F., alternatively from about 1,850° F. to about 2,250° F. Sintering may include maintaining the article 100 at the sintering temperature for any sintering duration, including, but not limited to, a duration of from about 5 minutes to about 150 minutes, alternatively from about 10 minutes to about 120 minutes, alternatively from about 15 minutes to about 90 minutes. Sintering may be performed under air, under inert gas, under vacuum, or a combination thereof.

The second portion 104 may be joined to the first portion 102 while being applied or may be joined subsequent to the application. The article 100 may be finished by any suitable finishing technique, including, but not limited to, heating, polishing, brushing, tip cleaning, sizing, chemically treating, or a combination thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heterogeneous composition, comprising:
   an alloy mixture, including:
      a first alloy having a first melting point of at least a first threshold temperature; and
      a second alloy having a second melting point of less than a second threshold temperature, the second threshold temperature being lower than the first threshold temperature; and
   a ceramic additive,
   wherein the first alloy, the second alloy, and the ceramic additive are intermixed with one another and fused together as distinct phases of the first alloy, the second alloy, and the ceramic additive, and
   wherein the first threshold temperature is about 2,400° F., and the second threshold temperature is about 2,350° F.

2. The heterogeneous composition of claim 1, wherein the first threshold temperature is about 2,450° F., and the second threshold temperature is about 2,300° F.

3. The heterogeneous composition of claim 1, wherein the first alloy is selected from the group consisting of a superalloy, a hard-to-weld (HTW) alloy, a refractory alloy, a nickel-based superalloy, a cobalt-based superalloy, an iron-based superalloy, an iron-based alloy, a steel alloy, a stainless steel alloy, a cobalt-based alloy, a nickel-based alloy, a titanium-based alloy, a titanium aluminide, GTD 111, GTD 444, HAYNES 188, INCONEL 738, MAR-M-247, René 108, René 142, René 195, and René N2, and combinations thereof.

4. The heterogeneous composition of claim 1, wherein the second alloy is selected from the group consisting of a braze alloy, an iron-based alloy, a steel alloy, a stainless steel alloy, a cobalt-based alloy, a nickel-based alloy, a titanium-based alloy, DF-4B, BNi-2, BNi-5 (AMS 4782), BNi-9, and combinations thereof.

5. The heterogeneous composition of claim 1, wherein the ceramic additive is selected from the group consisting of aluminum oxide, silicon carbide, tungsten carbide, titanium nitride, titanium carbonitride, titanium carbide, and combinations thereof.

6. The heterogeneous composition of claim 1, wherein the ceramic additive has a configuration selected from the group consisting of powder, fiber, nanotube, or a combination thereof.

7. The heterogeneous composition of claim 1, wherein the heterogeneous composition is a particulate.

8. The heterogeneous composition of claim 1, wherein the heterogeneous composition is a pre-sintered preform.

9. The heterogeneous composition of claim 1, wherein the alloy mixture includes, by weight, up to about 95% of the first alloy, and between about 5% to about 50% of the second alloy.

10. The heterogeneous composition of claim 1, including, by volume, between about 1% to about 50% of the ceramic additive.

11. The heterogeneous composition of claim 1, including a volume ratio of the ceramic additive to the alloy mixture of between about 15:85 and about 25:75.

12. The heterogeneous composition of claim 1, including a weight ratio of the first alloy to the second alloy of between about 85:15 and about 75:25.

13. An article, comprising:
    a first portion including a material composition; and
    a second portion including a heterogeneous composition, the heterogeneous composition including:
       an alloy mixture, including:
          a first alloy having a first melting point of at least a first threshold temperature; and
          a second alloy having a second melting point of less than a second threshold temperature, the second threshold temperature being lower than the first threshold temperature; and
       a ceramic additive,
       wherein the first alloy, the second alloy, and the ceramic additive are intermixed with one another and fused together as distinct phases of the first alloy, the second alloy, and the ceramic additive, and
       wherein the first threshold temperature is about 2,400° F., and the second threshold temperature is about 2,350° F.

14. The article of claim 13, wherein at least one of the material composition and the first alloy includes a hard-to-weld (HTW) alloy.

15. The article of claim 13, wherein the article is a turbine component.

16. The article of claim 15, wherein the turbine component is a bucket (blade) and the second portion is a squealer tip, or the turbine component is a shrouded bucket (blade) and the second portion is a contact pad at the inter-shroud contact surface.

17. A method for forming an article, comprising:
    applying a second portion to a first portion to form the article, wherein:
       the first portion includes a material composition; and
       the second portion includes a heterogeneous composition, the heterogeneous composition including:
          an alloy mixture, including:
             a first alloy having a first melting point of at least a first threshold temperature; and
             a second alloy having a second melting point of less than a second threshold temperature, the second threshold temperature being lower than the first threshold temperature; and
          a ceramic additive,
          wherein the first alloy, the second alloy, and the ceramic additive are intermixed with one another and fused together as distinct phases of the first alloy, the second alloy, and the ceramic additive, and wherein the first threshold temperature is about 2,400° F., and the second threshold temperature is about 2,350° F.

18. The method of claim 17, wherein applying the second portion to the first portion includes depositing the heterogeneous composition onto the first portion by an additive manufacturing technique.

19. The method of claim 17, wherein applying the second portion to the first portion includes depositing a pre-sintered preform including the heterogeneous composition onto the first portion and brazing the pre-sintered preform to the first portion.

20. The method of claim 17, further including subjecting the article to at least one of sintering and hot isostatic pressing.

* * * * *